(12) United States Patent
Sabin

(10) Patent No.: US 9,769,046 B2
(45) Date of Patent: Sep. 19, 2017

(54) SENSOR-BASED DETECTION AND REMEDIATION SYSTEM

(71) Applicant: DigiCert, Inc., Lehi, UT (US)

(72) Inventor: Jason Allen Sabin, Lehi, UT (US)

(73) Assignee: Digicert, Inc., Lehi, UT (US)

( * ) Notice: Subject to any disclaimer, the term of this patent is extended or adjusted under 35 U.S.C. 154(b) by 434 days.

(21) Appl. No.: 13/963,639

(22) Filed: Aug. 9, 2013

(65) Prior Publication Data

US 2014/0052849 A1 Feb. 20, 2014

Related U.S. Application Data

(60) Provisional application No. 61/683,163, filed on Aug. 14, 2012.

(51) Int. Cl.
  *G06F 15/173* (2006.01)
  *H04L 12/26* (2006.01)
  *H04L 12/24* (2006.01)

(52) U.S. Cl.
  CPC ............ *H04L 43/10* (2013.01); *H04L 41/046* (2013.01); *H04L 41/147* (2013.01)

(58) Field of Classification Search
  None
  See application file for complete search history.

(56) References Cited

U.S. PATENT DOCUMENTS

| | | | | |
|---|---|---|---|---|
| 5,689,645 A * | 11/1997 | Schettler | ............. | H04L 41/0213 709/221 |
| 7,493,659 B1 * | 2/2009 | Wu | ...................... | H04L 63/1416 726/26 |
| 7,970,871 B2 * | 6/2011 | Ewing | .................... | G01D 21/00 702/104 |
| 2007/0289013 A1 * | 12/2007 | Lim | ...................... | G06F 21/552 726/22 |
| 2009/0006522 A1 * | 1/2009 | Kim | .................. | H04L 29/12113 709/201 |
| 2011/0074587 A1 * | 3/2011 | Hamm | ............... | G06Q 10/0833 340/584 |
| 2012/0174208 A1 * | 7/2012 | Sperling | ............. | H04L 63/0823 726/10 |

* cited by examiner

*Primary Examiner* — Kenny Lin
(74) *Attorney, Agent, or Firm* — Kunzler Law Group, PC

(57) ABSTRACT

The invention comprises a method and system of deploying and managing sensor agents to provide services to networks and devices within a network. The invention dynamically deploys, initiates, and controls sensor agents that scan networks. Data obtained during the scan are returned to an analysis system for evaluation. Results are displayed to a user through a graphical interface or stored in a database. Results may also be used by the analysis system to remediate anomalies and provide graphical network information. Typically, a plurality of sensor agents are used to gather data in the aggregate and provide a more complete analysis on the operation and security of a network.

30 Claims, 8 Drawing Sheets

SENSOR-BASED DETECTION AND REMEDIATION SYSTEM

CROSS REFERENCE

This application claims the benefit of provisional application Ser. No. 61/683,163, filed on Aug. 14 2012, which is incorporated entirely herein by reference.

BACKGROUND

IT departments have numerous internal networks, remote offices, virtual networks, and now cloud networks, making it difficult to monitor and detect network and security problems or track installed software. Many different types of sensors exist, including anti-virus and vulnerability software. However, the industry needs a system that can coordinate various sensors and provide the information to the various reporting, remediation, and alert systems. Only when sensor agent information is observed as a whole can a security professional truly obtain an accurate knowledge of the risks and vulnerabilities of a network. In addition, using sensor agents can discover network configurations and previously unobserved instances of risk.

Because a sensor agent system can gather and analyse data from multiple sources, the results are more valuable than the sum of the individual data contributed by each sensor agent. A sensor-based system can track all of the various aspects of their certificates, where they are, as well as performing the numerous actions needed to resolve problems found.

SUMMARY OF THE INVENTION

Sensor agents are dynamically provisioned to discover and determine risk, problems, and potentially unknown issues with servers, devices and systems, including servers on internal networks, virtual networks, and isolated or cloud networks. The provisioning of sensor agents discover and determine problems within evaluated networks.

Multiple sensor agents can act within the system to provide comprehensive information about a scanned system. In addition, the system can include advanced capabilities to perform extensive analysis on networks, including certificate resources. If a problem is discovered the sensor agent can be used to perform automated remediation steps to resolve the problems discovered.

The system includes a remediation process to automatically solve issues and an alert system to provide notice to administrators about potential issues. The system is designed to deploy and dynamically manage sensor agents through the system, which provides significant resource control benefits. Remediation actions may be varied depending on the reporting sensor agent and the information contained with a relevant policy engine.

Using this invention a customer and IT department can resolve their concerns and worries as to what is occurring within their network and rely on this invention to address these concerns

DESCRIPTION OF INVENTION

Figure 1:
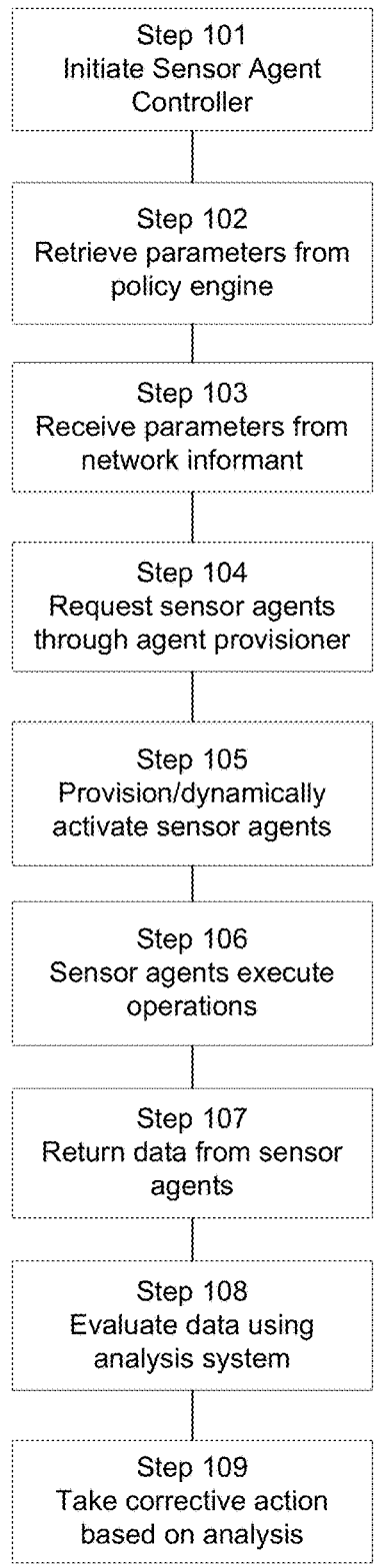
FIG. 1 is a flowchart showing an embodiment of the process and system.

The provided figures illustrate various embodiments of the invention; however, the invention is not limited to the specific implementation shown in the figures, as several of the steps and components are optional or intended only to increase performance, ease of use, and security of the overall system. A component or process, as used herein, may refer to a software package, virtual appliance, device, system, or other apparatus or process that can perform the described function.

Sensor agents 2 are any module, device, program, software, or other component capable of detecting anomalies within a network. Examples may include a component that can detect the installation of software on a machine, the connectivity of a network device, the installation or contents of a digital certificate, malware detection software, network configuration detection and tracking software, and vulnerability scanners. Sensor agents are available through a variety of sources, including third party applications, hardware devices, mobile platforms, and home-grown software.

Sensor agents may be virtual, installed, or static; however, the exact deployment and configuration is not necessarily the same as how the sensor agent will operate. The operating parameters are controlled by a sensor agent controller 4 as described below. Virtual agents are deployed and execute their function in or on a virtual space. Virtual agents are designed to dynamically and live only until completion of a process as controlled by the sensor agent controller and applicable policy engine 6. Installed agents dynamically deploy onto machines to execute and perform scans. These are often removed from the machine when completed, but are physically present within the system instead of being deployed from a virtual location, such as a cloud server. Static agents perform verification services from a set location and are not removed at the completion of their process.

A sensor agent controller 4 is a component that manages the sensor agent system. The sensor agent controller is responsible for initiating, terminating, and providing the scope of the sensor agents operation. For example, a sensor agent controller is the component that will deploy sensor agents when necessary, initiate a scanning sensor agent when requested by the user, limit the scope of a digital certificate evaluating sensor agent, and provide information to the sensor agents on the networks that should be evaluated during the sensor agent operation. The sensor agent can make these determinations as part of its operation or receive the data from a policy engine 6 and network informant 8. The sensor agent may include or access an analysis system component 40 that interprets and reacts to the data returned by the sensor agents. A sensor agent may communicate with sensor agents directly or through a separate agent provisioner 14.

A policy engine 6 is a component that the sensor agent controller uses to determine the operating parameters of the sensor agents, such as parameters for when to initiate sensor agents, where the sensor agents initiate, whether to install the sensor agents on the machine or deploy the sensor agents from a cloud-based location, the systems that a sensor agent should operate on, and where to return the data obtained by the sensor agent. A policy engine may also include information on how to handle flags 12 raised during the processes operation and be an integral part of the analysis component.

The policy engine may also control the sensor agent controller's operating parameters, including the initiation and termination of the sensor agent controller. When controlling the sensor agent controller, the policy engine can set the configuration and policy decisions about how often the sensor agent controller is initiated and which sensor agents are provisioned during each initiation of the sensor agent controller. The policy engine can communicate with a scheduler 20 to determine how often and when the sensor agent controller should initiate the analysis component.

The policy engine does not need to be located within the same network system as the sensor agent controller. Similarly, the sensor agents will likely not be in the same network as the sensor agent controller. The sensor agent controller can retrieve information from multiple policy engines to make the sensor agent operations specific to the user and the networks where the sensor agent will operate. Policy engine details may be controlled by the network operator or by a service provider.

A policy engine is not necessarily a separate component from the agent controller and is typically a database with which the sensor agent controller is designed to interact. The policy engine may be part of the sensor agent controller, the sensor agent, or a completely separate independent component. Operating parameters set by a policy engine may be as simple as requiring execution of all available sensor agents or be much more complex.

A network informant 8 is a process that provides information about the networks and systems requiring sensor agent activity. For example, a network informant might instruct the sensor agent controller to analyse systems in an internal or static network 22 that contains physical machines, a virtual network 24 running on a VM server, or a cloud network 26. A network informant can automatically detect networks available, be configured by an end user with the appropriate settings, rely on a combination of the two, or receive network input from another data source. Sensor agent controllers use the information provided by a network informant in combination with the policy engine information to determine a sensor agent's authorized scope of operations.

Figure 2:
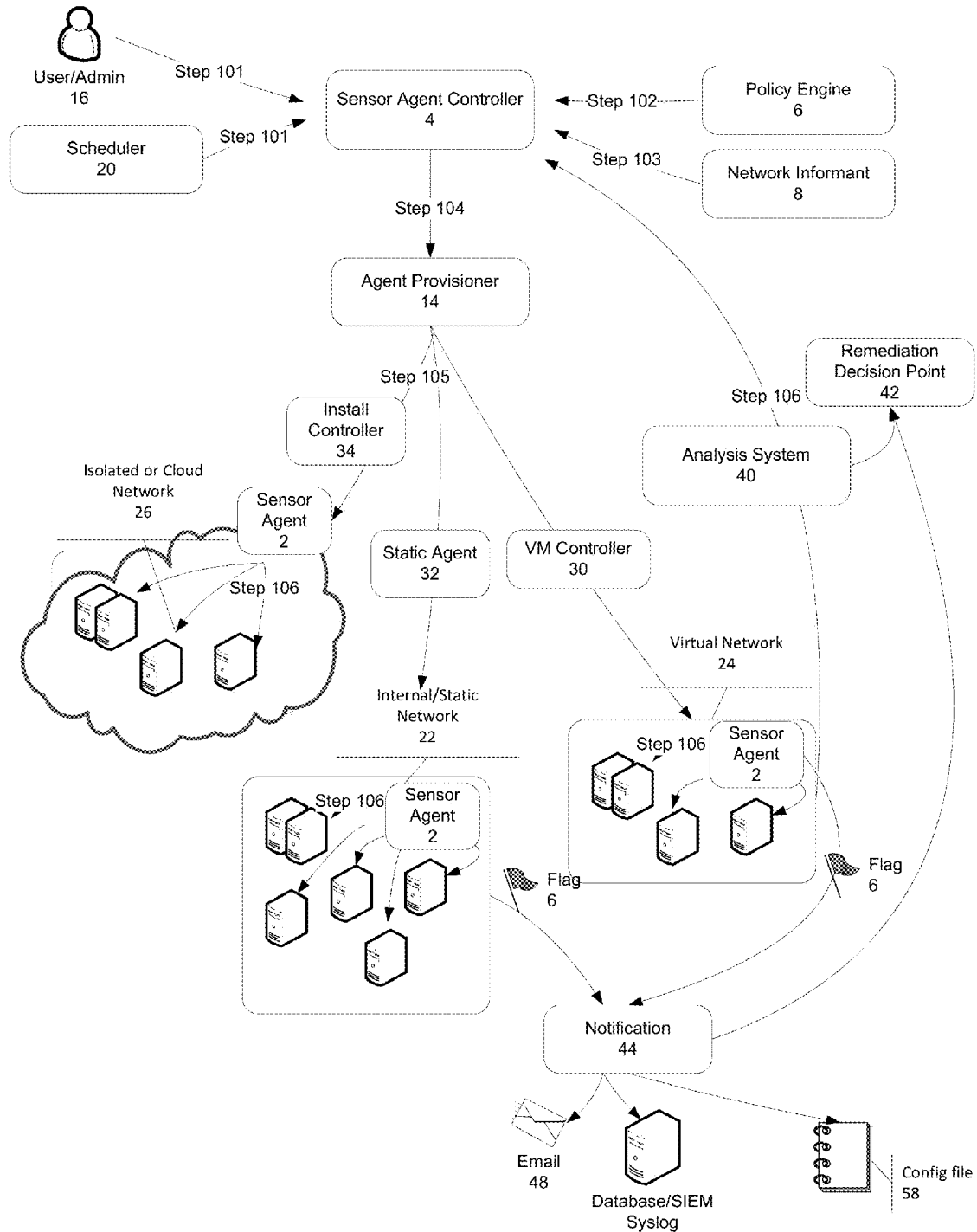
FIG. 2 is a depiction of the components used in the embodiment shown in FIG. 1.

In one embodiment of the invention, as shown FIG. 1 and FIG. 2, the sensor agent controller initiates. Initiation of the sensor agent controller may be in response to a policy engine's settings, based on a the settings of a scheduler component 20 (such as a scan configured to occur on a set day and time), or requested by a system administrator or end user 16.

In step 102 and if a policy engine is available, the sensor agent controller retrieves the applicable operating parameters from the policy engine.

In step 103, the sensor agent controller communicates with a network informant to determine where to deploy and manage sensor agents.

In step 104, once the network informant has identified the appropriate networks, the sensor agent controller instructs the agent provisioner to execute sensor agents. The agent provisioner uses the information from the network informant to identify the appropriate location for the operation and the information from the policy engine to determine the scope of the operation.

In step 105, if the sensor agent is not already operational on the network, the agent provisioner can dynamically provide the sensor agent access to the appropriate system, as set by the policy engine and network informant, and initiate the appropriate sensor agents. Dynamically gaining access may include installing the sensor agents within the local bounds of the network, installing the sensor agents on the device designated for scanning, creating a tunnel (such as a VPN tunnel) into the network resource, installing the sensor agent on a deployed hardware device, or operating the sensor agent remotely through the cloud.

The agent provisioner can deploy and/or provisions sensor agents using a variety of methods, such as a VM controller 30 to deploy or provision any type of sensor, an install controller 34 that deploys or provisions installed controllers, or a static agent 32 that deploys or provisions static agents.

A VM controller provisions virtual agents using API commands sent to the VM Server Hypervisor (for example VMWare or XEN) or by provisioning a new virtual appliance to a local network. Any network can use the VM controller to initiate analysis tools. Install controllers use API commands to initiate installed sensor agents operating on a local server. The sensor agent controller can initiate sensor agents in sequence or initiate multiple sensor agents simultaneously to analyze a single or multiple networks.

In step 106, once a sensor agent is created and/or initiated, the sensor agent performs its designated operation. As mentioned, the designated operation is determined by instructions sent through the sensor agent controller using the information provided by the user, network informant, and policy engine. These operations may include evaluate a device, network or system for changes, scanning a network for hidden machines, scanning for vulnerabilities, or similar other operations of sensor agents.

In step 107, information discovered by a sensor agent is sent back to the sensor agent controller for storage and analysis. Information may be returned throughout the process, or as new information is about the system or network is discovered. This information is stored in a location that can be accessed later by the analysis system (if applicable).

In step 108, the information can be evaluated by an analysis system 40. An analysis system may include a remediation decision point 42 that determines the steps a system should take in response to a detected anomaly, such as a hidden device, malware, or a malfunctioning system. Possible actions may include a shutdown of the system, isolation of anomaly, monitoring of the anomaly, deployment of a remediation agent that can rectify the problem, remediation by the sensor agent itself, a re-configuration of the system or network, a notification sent to an administrator, or some similar action.

As sensor agents discover, scan, and validate systems and devices, either the sensor agent or sensor agent controller generates flags warnings, errors, and security issues. This may include flags for detected vulnerabilities, failures of systems to initiate, and failure of the system to complete successfully. Flags may also be raised for other suspicious occurrences such as if connectivity is limited or if network settings have changed since the last scan or if a hacker is trying to access a network or modify security settings. These are delivered to the appropriate network administrator or network system (such as security logs) using a notification 44 process. The notification process uses the policy settings and a remediation decision point to determine what action is taken in response to a flag, warranting, error, or security issue. Possible actions include shutting down the network or a device on the network, isolating the incident, monitoring the incident and reporting on the incident, redeploying a non-compliant application or file, or reconfiguring the machine or network. Throughout the process, anytime there are issues, warning, errors, or unknown situations are encountered, the notification process can send notices via syslog, SIEM 46, email 48, or any other notification possibilities.

Monitoring actions may include extra logging, network sniffing, or automated forensic analysis. A VM could redeploy the virtual machine from a gold master VM. If the agent is running locally, automatic re-configuration could occur. This would include modifying the config files 58 and restarting the problem application.

Figure 3:
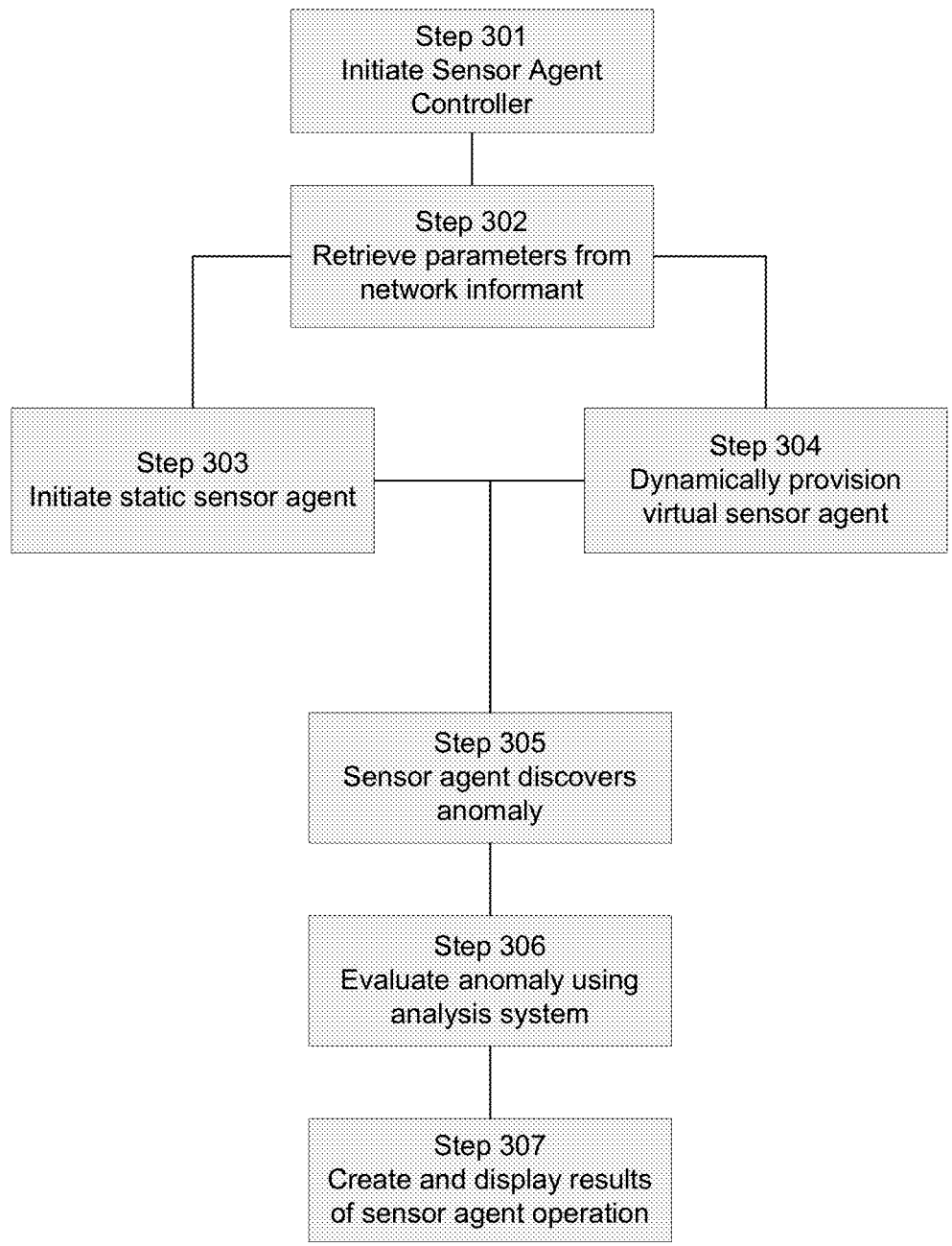
FIG. 3 is a flowchart of a second embodiment of the process and system.
Figure 4:
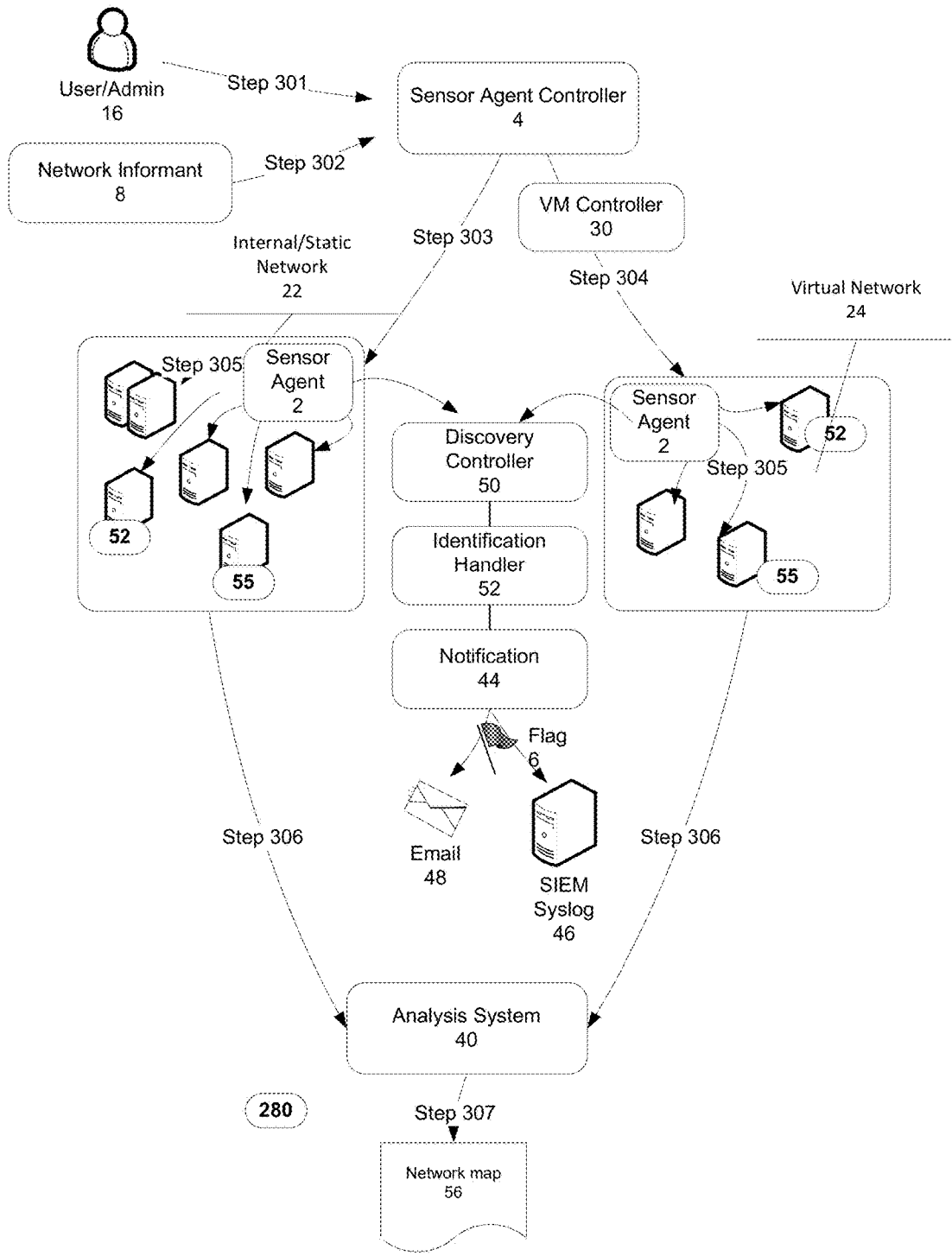
FIG. 4 is a depiction of the components used in the embodiment shown in FIG. 3.

In an alternate embodiment, shown in FIG. 3, the system is designed solely to use sensor agents to create a network map.

In step 301, the sensor agent controller is initiated by a user action.

In step 302, the sensor agent controller receives information about which networks are of interest in creating the network map. In this embodiment, the information is stored in a network informant but could easily have been provided by the user.

In step 303, the sensor agent controller (acting as the agent provisioner) initiates a sensor agent on an internal network identified by the network informant. In this embodiment, the sensor agent is pre-installed on a device with then internal network. The sensor agent conducts scanning of the internal network associated with the device to detect any devices on the network, including hidden devices 52 and devices of unknown status 54.

In this embodiment, the sensor agents may have a variety of scanning capabilities. One such capability may include a discovery controller 50 that uses the policy decisions and settings from other components to perform discovery actions when scanning IP addresses, ports, and networks and permit the sensor agent to detect physical and virtual machines within a network.

In step 304, the sensor agent controller (again acting as the agent provisioner) initiates a sensor agent on a virtual network, instructing a VM controller to initiate an instance of the sensor agent. After initiation, the sensor agent operates on the virtual network, detecting all of the devices within the virtual network, including hidden and unknown devices. Once detection is complete, the sensor agent is removed from virtual network.

In step 305, if the sensor agent discovers a machine not previously identified, a malicious machine, or instance initiating by a hacker, the sensor agent requests identification and cataloguing by an identification handler process 52. This provides admins with the ability see, discover, and find hidden and compromised machines and give them an automated remediation action. The identification handler process receives this input from a network map, by input from a user, querying a database of such information, or in some similar fashion.

In step 306, the sensor agents may return information to the analysis system. Returning the information can occur throughout the sensor agents' operation or be a batch upload once the sensor agent is complete. This information may include flags sent to the notification system and forwarded to an SIEM syslog and an email to the user that provides an alert on each discovered or new hidden or unknown device within the network.

In step 307, the analysis system finishes evaluating the data and displays the appropriate results. In this case, the sensor agents are network discovery tools and display a complete network map 56 to the user. The network map identifies the hidden devices separately from the unknown devices.

Figure 5:
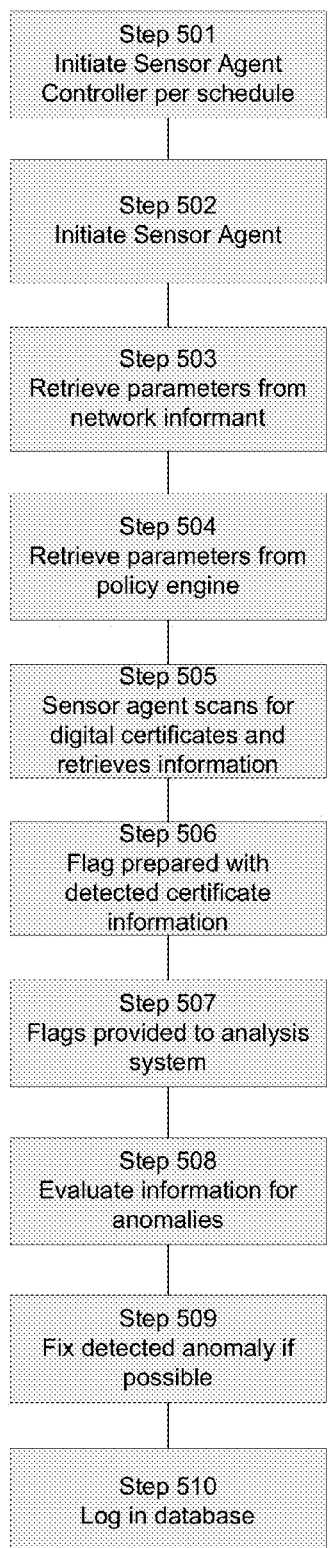
FIG. 5 is a flowchart of a third embodiment of the process and system.
Figure 6:
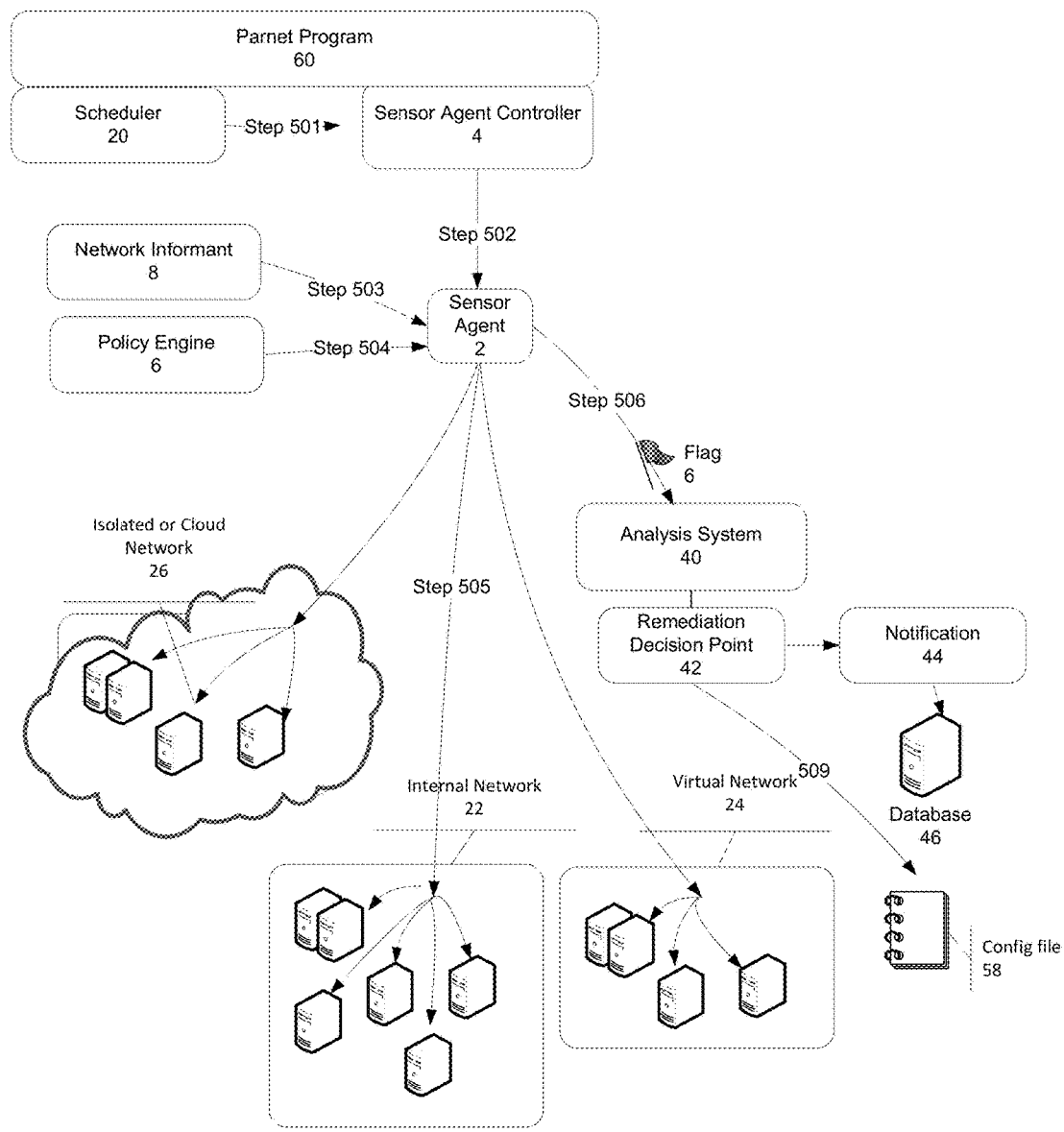
FIG. 6 is a depiction of the components used in the embodiment shown in FIG. 3.

FIGS. 5 and 6 shows an embodiment where the sensor agents include a digital certificate validator that periodically scans a network to validate the presence and configuration of digital certificates. This embodiment views the sensor agent controller as module within vulnerability or malware scanning software 60.

In step 501, the sensor agent controller initiates as part of the parent program's scheduled operation. In step 502, the sensor agent controller activates the sensor agent, which includes a certificate validator process 62.

In step 503, the sensor agent retrieves information about the networks to scan from the network informant. In this instance the sensor agent is acting as the sensor agent provisioner and sensor agent controller to interact directly with the network informant.

In step 504, the sensor agent retrieves information from a policy engine about which type of digital certificates (SSL v. client certificates) to evaluate. Again, the sensor agent is acting as the sensor agent controller to evaluate information stored in a policy engine.

In step 505, the sensor agent operates on the specified networks. The sensor agent discovers digital certificates on the scanned networks. In step 506, the sensor agent prepares flags from the sensor agent about discovered certificates. These flags include information based on the retrieved certificate information. This report may include information such as the digital certificate features/options, key lengths, type of certificate signature, CA's, self-signed, etc . . . The flag may be customized to take a different action based on the type of certificate discovered, such as only reporting SSL certificates.

In Step 507, this flag information/report is fed into the analysis system which then evaluates the data to detect malformed certificates, installation problems, and problematic settings. The analysis system may also compare the detected data with historical information from the network to determine if the digital certificate was modified since the last scan and check for problems in the certificate provisioning process.

Figure 7:
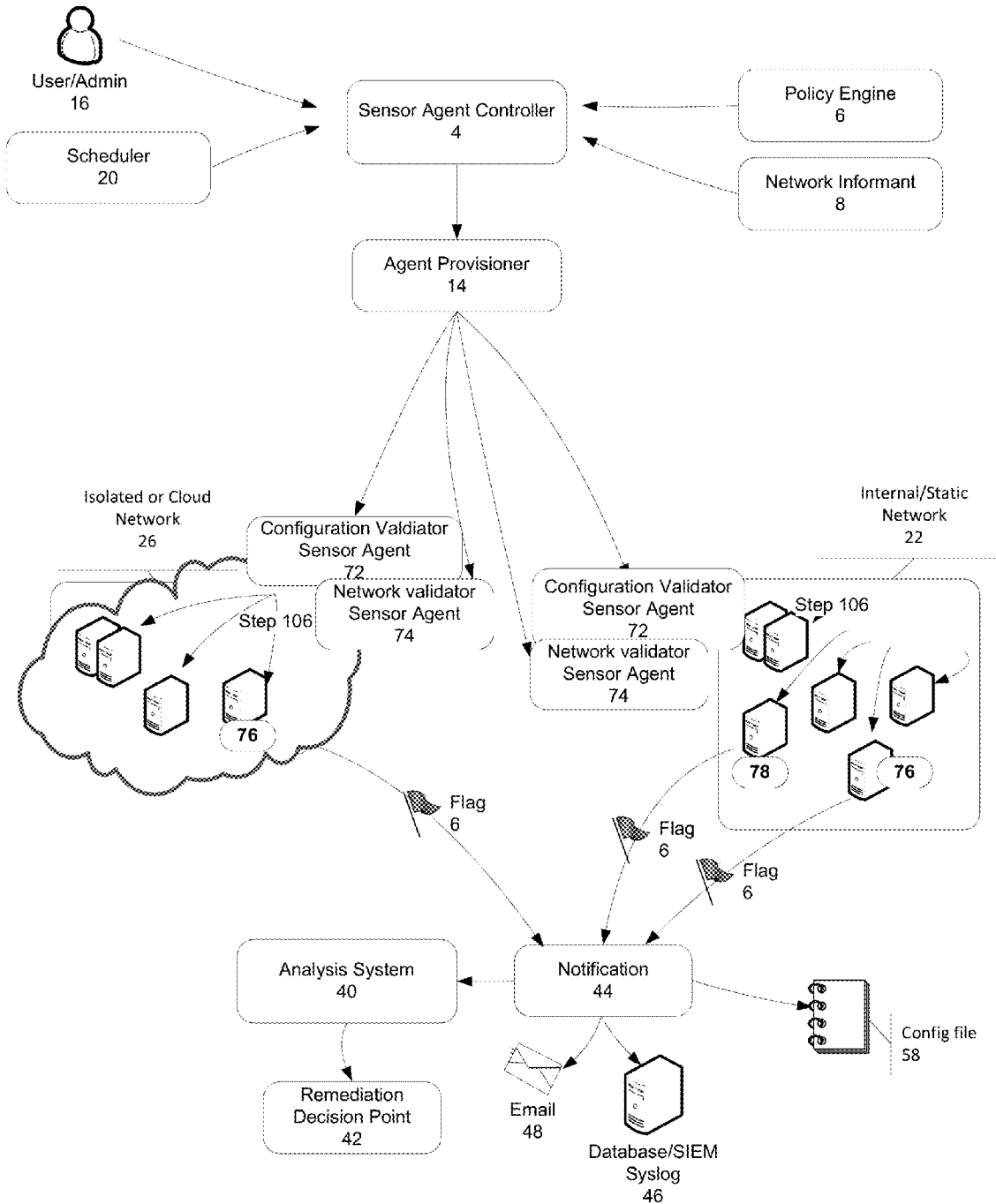
FIG. 7 is a depiction of the components used in a fourth embodiment of the process and system.

The embodiment shown in FIG. 7 uses sensor agents that are configuration validators 72 and network validators 74 to validate a network and detect security vulnerabilities. Once the sensor agents initiate, by schedule or by user request, the sensor agents scan machines for specific or compromised security settings and validation. This check may include a list of valid encryption algorithms, weak keys, and server configurations settings and a scan for possible vulnerabilities. The network validator sensor agent checks network settings and device locations to ensure settings and network operations are working appropriately. If a vulnerable machine 76 is detected or a network device is not properly configured 78, then an alert or flag is raised and sent to the appropriate database. The system may include a remediation decision point that can automatically repair common misconfigurations or vulnerabilities.

Figure 8:
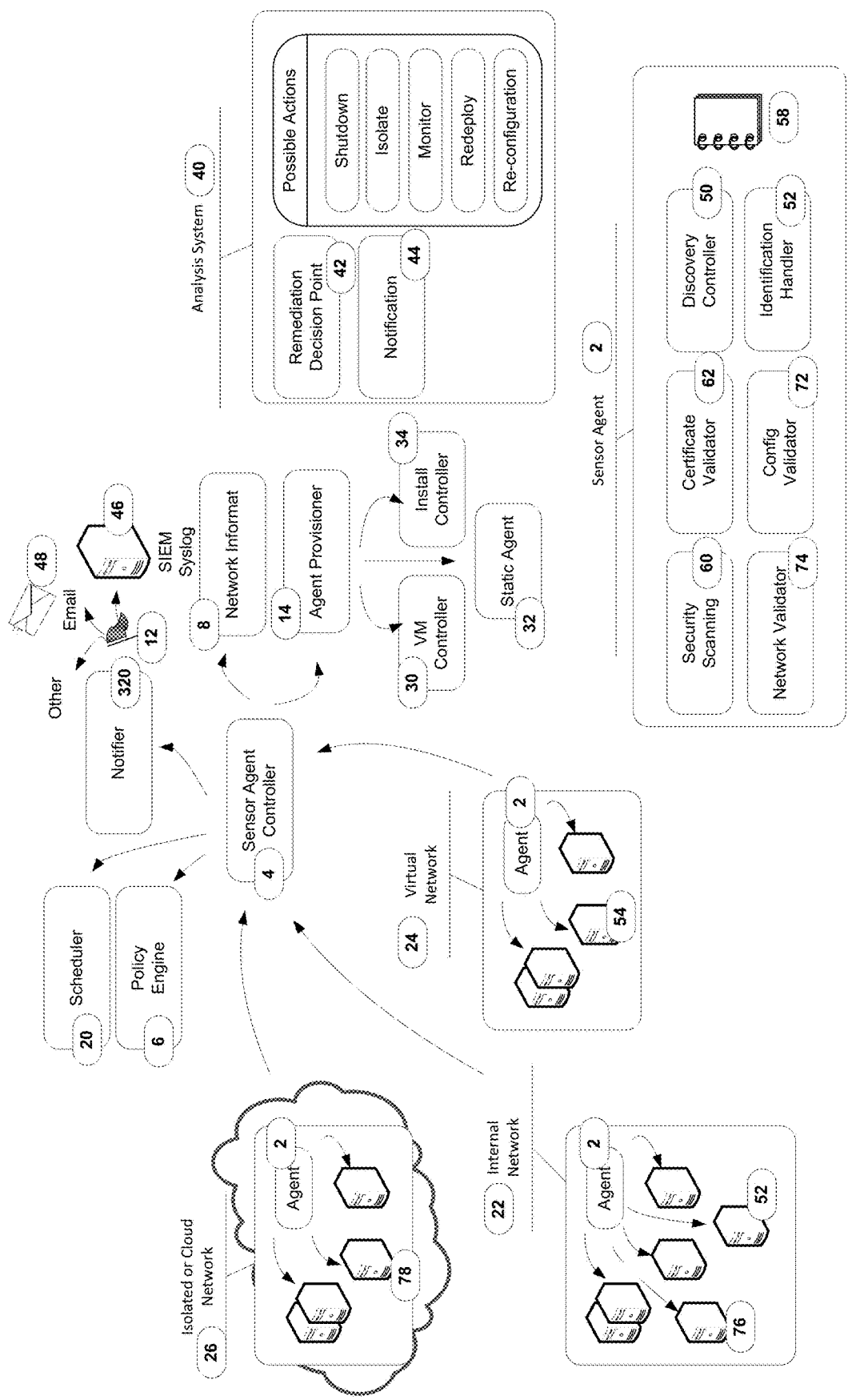
FIG. 8 is a depiction of the components used in a fifth embodiment of the system and process.

Of course, as shown in FIG. 8, the sensor agent may include multiple components with a variety of functions. This permits the sensor agent system to scan for vulnerabilities, create network maps, and fix common network misconfigurations without requiring access to separate systems.

Although the invention has been described with reference to certain embodiments, the e patent is not limited to the exact details of the detailed description. Anyone skilled in the art will appreciate that numerous changes and modifications may be made to the preferred embodiments of the invention without departing from the true spirit of the invention. The claims should be construed to cover equivalent variations of the described invention.

What is claimed is:

1. A computer program product comprising a non-transitory computer readable storage medium storing computer usable program code executable to perform operations, the operations comprising:
   scanning a network for anomalies, using at least one sensor agent;
   detecting one or more anomalies while scanning the network, the one or more anomalies comprising a digital certificate that does not satisfy a predefined configuration of digital certificates for the network as defined by one or more policies, the predefined configuration defining one or more types of digital certificates on the network to evaluate and one or more characteristics of the digital certificates to evaluate; and
   performing one or more remediation actions for the detected one or more anomalies.

2. A computer program product according to claim 1, wherein the operations further comprise obtaining operating parameters for the sensor agent from a policy engine.

3. A computer program product according to claim 1, wherein the information about the network is providing by a network informant.

4. A computer program product according to claim 1, wherein the operations further comprise having the sensor agent return information to an analysis system.

5. A computer program product according to claim 4, wherein the analysis system includes a remediation decision point that takes a remediation action in response to the information provided by the sensor agent.

6. A computer program product according to claim 4, wherein the operations further comprise initiating a second sensor agent in response to the information provided by the sensor agent.

7. A computer program product according to claim 1, wherein the sensor agent is initiated through an agent provisioner.

8. A computer program product according to claim 7, wherein initiating the sensor agent comprises dynamically deploying the sensor agent within the network.

9. A computer program product according to claim 1, wherein the operations further comprise generating a flag that is sent to a notification component, the flag indicating one or more of:
   detected vulnerabilities;
   failures of network systems to initiate;
   failures of network systems to successfully complete;
   limited network connectivity;
   changed network settings since last network scan;
   unauthorized network access; and
   unauthorized modification of security settings.

10. A method comprising:
    scanning a network for anomalies, using at least one sensor agent;
    detecting one or more anomalies while scanning the network, the one or more anomalies comprising a digital certificate that does not satisfy a predefined configuration of digital certificates for the network as defined by one or more policies, the predefined configuration defining one or more types of digital certificates on the network to evaluate and one or more characteristics of the digital certificates to evaluate; and
    performing one or more remediation actions for the detected one or more anomalies.

11. A method according to claim 10, further comprising determining a remediation process to follow in response to detection of an anomaly on the network, the remediation process comprising one or more actions for resolving the anomaly, the one or more actions comprising:
    shutdown of one or more devices on the network;
    isolation of the anomaly;
    monitoring of the anomaly;
    deployment of a remediation agent that can rectify the anomaly;
    remediation of the anomaly by the sensor agent;
    re-configuration of one or more devices in the network;
    re-configuration of the network; and
    sending a notification to an administrator.

12. A method according to claim 10, further comprising detecting-one or more of hidden devices and devices having an unknown status within the network.

13. A method according to claim 10, further comprising sending an alert about hidden and unknown devices detected within the network.

14. A method according to claim 10, further comprising creating a map of the network based on the detected anomalies, wherein hidden devices are identified on the map separately from unknown devices.

15. A method according to claim 14, further comprising one or more of sending a notification to a user about the hidden and unknown devices in the network and writing information to a log file about the hidden and unknown devices in the network.

16. A method according to claim 15, wherein the notification is an email that comprises an alert on each hidden and unknown device in the network that is one or more of discovered and new.

17. A method according to claim 10, further comprising modifying a configuration file associated with a network device based on the detected anomalies.

18. A method according to claim 10, wherein the at least one sensor agent comprises a network validator that evaluates the contents of digital certificates discovered on the network to determine whether the contents comply with the predefined configuration of digital certificates defined by the one or more policies.

19. A method according to claim 18, wherein the predefined configuration comprises one or more of:
    digital certificate features and options;
    key lengths;
    types of certificate signatures;
    certificate authorities that issued the digital certificates; and
    self-signed signatures.

20. A method according to claim 10, wherein the sensor agent is initiated through a VM controller and operates on a virtual network.

21. A method according to claim 10, further comprising deploying the at least one sensor agent dynamically at a network location on the network based on information from one or more of a policy and an analysis of the network.

22. A method according to claim 10, further comprising:
    receiving data associated with the digital certificates from the scan performed by the at least one sensor agent;

evaluating the data to detect one or more of malformed digital certificates, installation problems, and problematic settings;

comparing the data with historical certificate data to determine if the digital certificates were modified since a recent scan; and displaying results of the data evaluations and comparisons.

23. A method according to claim 22, wherein the data is received from the at least one sensor agent continuously while the at least one sensor agent scans the network.

24. A method according to claim 22, wherein the data is received from the at least one sensor agent as a batch upload in response to the at least one sensor agent completing the network scan.

25. A system comprising:
a device connected to a network;
a sensor agent controller executing on the device, the sensor agent controller configured to deploy at least one sensor agent on the network, the at least one sensor agent configured to:
scan the network for anomalies;
detect one or more anomalies while scanning the network, the one or more anomalies comprising a digital certificate that does not satisfy a predefined configuration of digital certificates for the network as defined by one or more policies, the predefined configuration defining one or more types of digital certificates on the network to evaluate and one or more characteristics of the digital certificates to evaluate; and
perform one or more remediation actions for the detected one or more anomalies.

26. A system according to claim 25, wherein the sensor agent controller comprises an agent provisioner that deploys the at least one sensor agent dynamically at a network location on the network based on information from one or more of a policy and an analysis of the network.

27. A system according to claim 25, wherein the at least one sensor agent comprises a plurality of sensor agents that are initiated by the sensor agent controller.

28. A system according to claim 25, further comprising a an analysis system that:
receives data associated with the digital certificates from the scan performed by the at least one sensor agent;
evaluates the data to detect one or more of malformed digital certificates, installation problems, and problematic settings;
compares the data with historical certificate data to determine if the digital certificates were modified since a recent scan; and
displays results of the data evaluations and comparisons.

29. A system according to claim 28, wherein the analysis system provides visual indicators about the data received from the at least one sensor agent.

30. A system according to claim 29, wherein the visual indicators comprise security information about the network.

* * * * *